Figure 1:
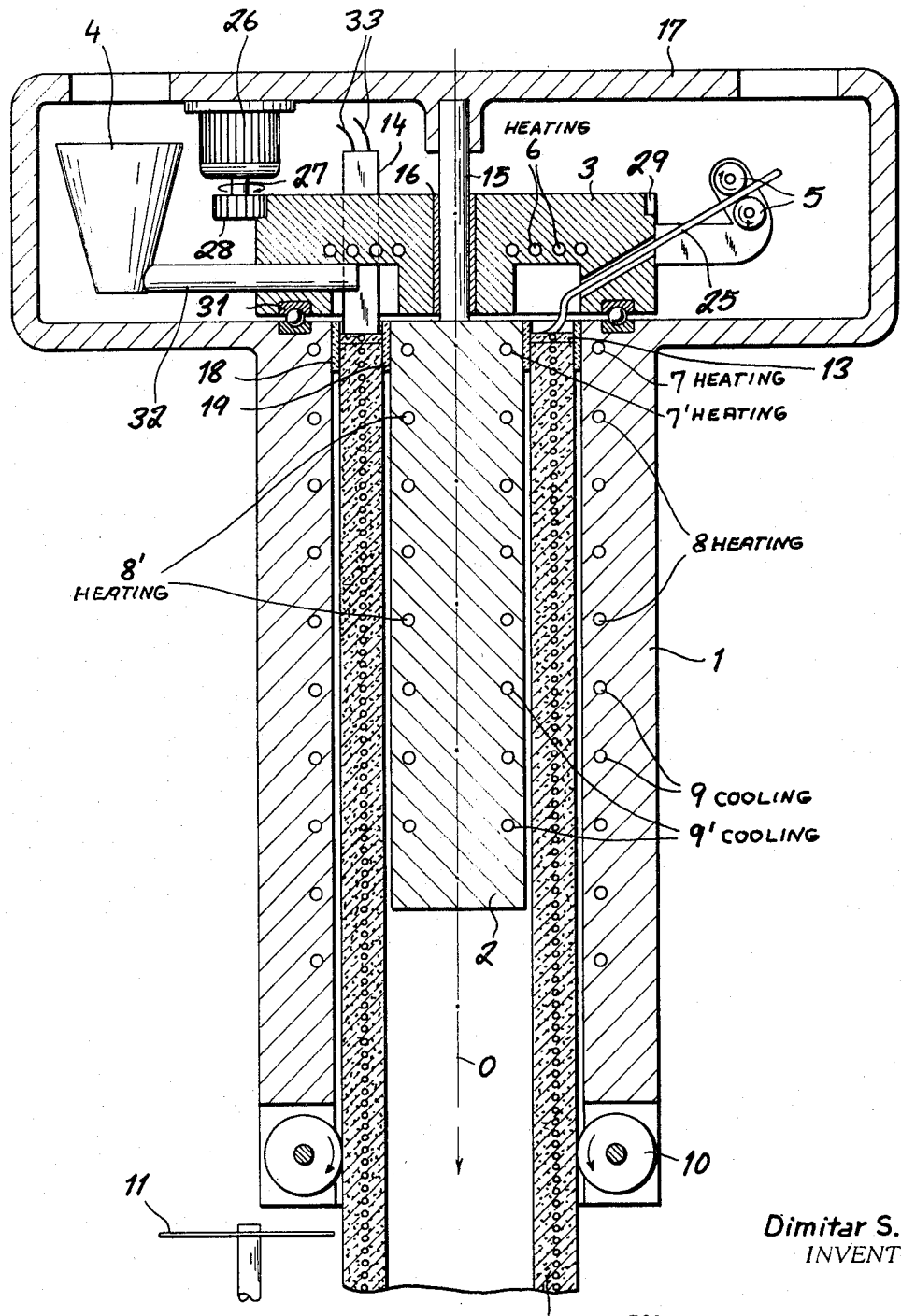

United States Patent [19]
Velev

[11] 3,767,373
[45] Oct. 23, 1973

[54] CYLINDRICAL FURNACE FOR CONTINUOUS PRODUCTION OF REINFORCED AND NONREINFORCED SEAMLESS PIPES OF FOAM GLASS

[75] Inventor: Dimitar Spassov Velev, Rousse, Bulgaria

[73] Assignee: Nis Pri Vimmess, Rousse, Bulgaria

[22] Filed: Nov. 15, 1971

[21] Appl. No.: 198,777

Related U.S. Application Data

[63] Continuation-in-part of Ser. No. 179,528, Dec. 16, 1971, abandoned, Continuation of Ser. No. 778,455, Nov. 25, 1968, abandoned.

[52] U.S. Cl............................ 65/144, 65/18, 65/146, 264/176 R, 264/209
[51] Int. Cl............................................ C03b 19/06
[58] Field of Search ..................... 65/18, 22, 88, 87, 65/141, 335, 144; 264/176 R, 209

[56] References Cited
UNITED STATES PATENTS

| | | | |
|---|---|---|---|
| 3,293,692 | 12/1966 | Rosenbaum | 65/22 X |
| 3,527,587 | 9/1970 | Velev et al. | 65/22 |
| 3,574,583 | 4/1971 | Goldsmith | 65/22 |
| 3,404,203 | 10/1968 | Donald | 264/209 X |
| 2,620,597 | 12/1952 | Ford | 65/22 |

FOREIGN PATENTS OR APPLICATIONS
330,943  6/1930  Great Britain ........................ 65/144

Primary Examiner—Robert L. Lindsay, Jr.
Attorney—Karl F. Ross

[57] ABSTRACT

Foam glass is poured into a vertical annular chamber of a furnace through a header which rotates with reference to the furnace about the chamber axis to deposit the glass in the chamber as a helical layer; the temperature of the chamber is controlled to let the glass layer harden into a pipe as it descends. Extraction rollers beneath the chamber continuously remove the newly produced pipe from the furnace.

10 Claims, 2 Drawing Figures

Dimitar S. Velev
INVENTOR.

BY

Karl F. Ross
Attorney

CYLINDRICAL FURNACE FOR CONTINUOUS PRODUCTION OF REINFORCED AND NONREINFORCED SEAMLESS PIPES OF FOAM GLASS

This application is a continuation-in-part of my pending application Ser. No. 179,528 filed Dec. 16, 1971 as a streamlined continuation of my application Ser. No. 778,455 filed Nov. 25, 1968 both now abandoned.

My present invention relates to an apparatus for producing large-diameter pipes of foamed glass, with or without internal reinforcements, by a continuous process with the aid of an upright kiln or furnace forming a vertical heating chamber.

A kiln of this general type has been disclosed in U.S. Pat. No. 3,527,587 issued Sept. 8, 1970 to D.S. VELEV et al. In the system of this prior patent, a charge of foamable glass is continuously introduced into the heating chamber at the top of the kiln in which it progressively descends in the form of a hardening column extracted by friction rollers beneath the open bottom of the chamber. The charge is heated in the upper part and forcedly cooled in the lower part of the chamber; each fresh layer of foamable glass, deposited on the top of the descending column, homogeneously blends with the body of that column. This process, therefore, enables the formation of foam-glass rods or bars of indefinite length which can then be cut to size as desired.

The general object of my present invention is to provide an apparatus suitable for the continuous production, in a basically similar manner, of tubular rather than solid stock of foam glass.

One of the problems encountered in shaping such tubes or pipes in a kiln is the need for providing a central core which must be so mounted as not to interfere with the supply of foamable glass to the annular chamber defined by that core and the surrounding furnace wall. A related problem is that of evenly distributing the glass mass about the core to insure uniform thickness and strength of the product. Difficulties arise also from the fact that the hardening glass, sandwiched between the chamber wall and the core, tends to adhere to the core surface as it shrinks in the lower portion of the chamber designed as a cooling zone.

A more particular object of my present invention, therefore, is to provide an apparatus for the purpose set forth which avoids the aforestated difficulties.

These objects are realized, pursuant to my present invention, by the provision of a header overlying the kiln coaxially with the annular heating chamber thereof, the kiln and the header being provided with drive means for relatively rotating same about their vertical axis during operation of a feeder which is carried on the header and includes a hopper for the continuous delivery of foamable glass mass to the top of the chamber. A restricted neck at the top of this chamber, advantageously formed by concentric rings of refractory material, maintains annular clearances between the inner and outer chamber surfaces, on the one hand, and the descending tubular glass body continuously formed therebetween, on the other hand. Advantageously, not only the kiln wall or shell but also the header and the core are provided with temperature-control means for heating that body in the upper part and cooling it in the lower part of the chamber.

Internal reinforcements, such as wire strands, may be continuously introduced into the annular chamber by a supply mechanism also mounted on the header.

At the beginning of operations, when the kiln is empty, the bottom of the chamber may be plugged by a temporary support for the initial charge, this support advantageously taking the form of an annular platform which is mounted on an elevatable base and fits closely between the two refractory annular shoulders forming the reduced neck. The progressive lowering of the base and of the supporting platform lets the charge descend at the required speed, correlated with the rate of feeding, to the bottom of the chamber where the hardened glass tube is gripped by extraction means such as friction rollers.

Figure 2:
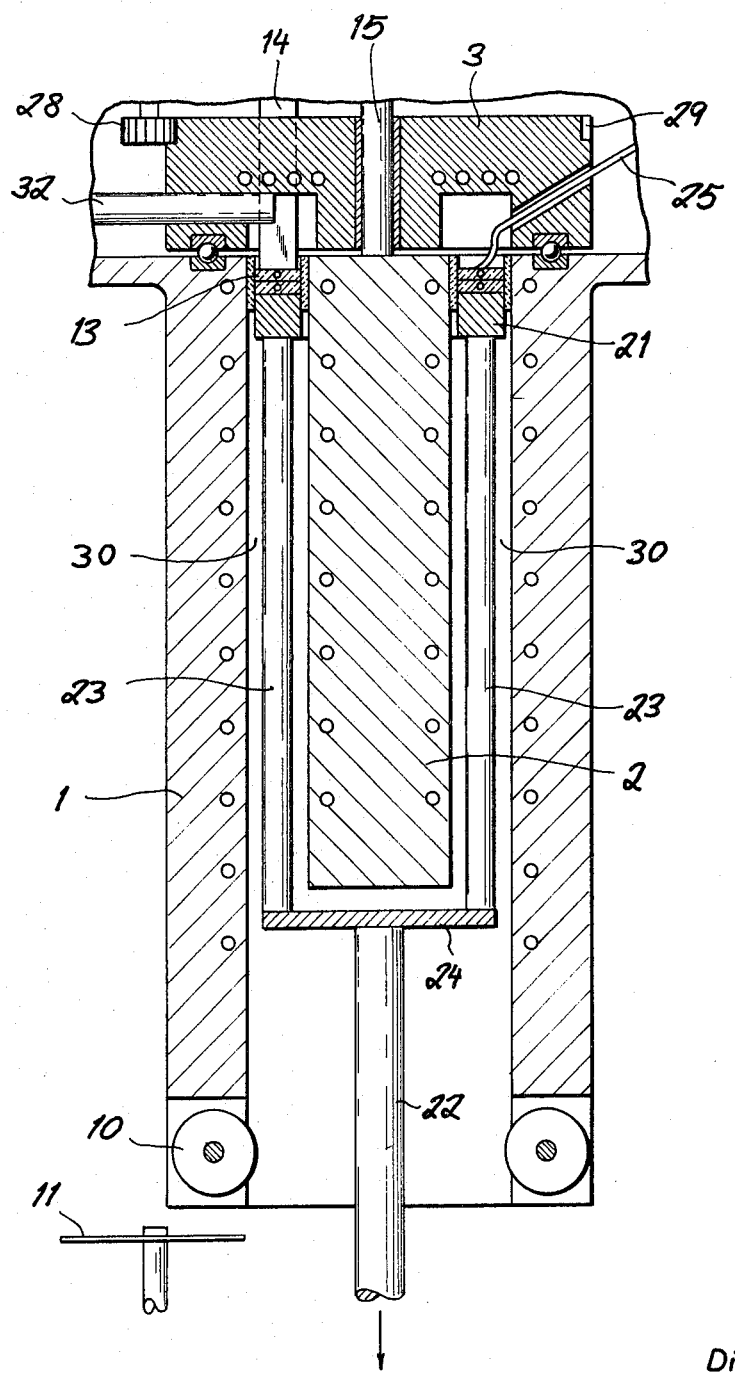

The invention will be described in greater detail hereinafter with reference to the accompanying drawing in which:

FIG. 1 shows, in vertical section, an apparatus according to the invention in operating condition; and FIG. 2 is a view similar to FIG. 1, showing the apparatus at the start of operations.

The apparatus shown in the drawing comprises a kiln 1 in the form of a cylindrical shell with a cylindrical core 2 defining between them an annular heating chamber 30. A header 3 carries a hopper 4 for a continuous feeding of foamable glass mass into the space 30. Kiln 1 and header 3 are relatively rotatable, about their common axis 0, with the aid of drive means here diagrammatically represented by a motor 26 whose shaft 27 carries a pinion 28 in mesh with peripheral teeth 29 of the header. Motor 26 is mounted on a beam 17 which is structurally integral with kiln 1 and also carries a rod 15 from which the core 2 is suspended, the rod passing through a central bore 16 of the header 3 and serving as a journal bearing therefor.

For the purpose of this description it will be assumed that the kiln is stationary while the header rotates.

Also mounted on header 3 are a pair of counter-rotating rollers 5 serving to introduce a reinforcing wire 25 into the chamber 30; the drive of rollers 5 may be synchronized in any convenient manner with the rotation of the header. Such rotation is facilitated by the provision of ball bearings 31 at the top of the kiln 1.

Hopper 4 supplies the charge to an outlet tube 32 which may contain, for example, a continuously rotating feed screw synchronized with the rotary drive. The material issuing from tube 32 is kept at the desired elevated temperature by heating means 6 on header 3, here shown as a set of channels at its lower surface which may accommodate electric heating elements or conduits traversed by a hot fluid. A similar heater 7 is disposed in the wall of kiln 1 near the top thereof, at the level of a restricted foaming zone of chamber 30 defined by a pair of concentric annular strips 18, 19 projecting from the outer and inner chamber walls. These strips may consist, for example, of a sintered mixture of carbon and refractory particles.

Within the restricted zone so defined, the feeding tube 32 deposits a continuous foaming layer 13 of helical configuration on a tubular body 12 of foam glass exiting at a corresponding rate from the lower end of the kiln 1 under traction from a pair of friction rollers 10 driven at the proper speed in synchronism with the feeding mechanism. Uniform thickness of layer 13 is achieved with the aid of a doctor blade 14 on header 3 electrically heated via wires 33. The temperature of the progressively descending tube 12 is controlled by further heating means 8 in the kiln wall and supplemental heaters 8' in the core, similar to the elements 6, 7 described above, and by cooling means 9, 9' at a level below the heating zone, e.g., sets of channels in shell 1 and core 2 traversed by a low-temperature fluid. It will be noted that cooling begins along the lower part of core 2 but that the outer cooling elements 9 continue below the end of the core. A horizontal cutting disk 11, on a carriage (not shown) guided for travel around the furnace axis O, may be swung inwardly to sever the tube 12 after a predetermined length thereof has been produced.

At the beginning of a production cycle, with furnace chamber 30 empty of foam glass, an annular platform 21 closely fitting between rings 18 and 19 plugs the neck of the chamber to receive the initial charge (see FIG. 2). Platform 21 is supported by means of stays 23 on a base 24 having a central stem 22 by which it may be raised and lowered, e.g., hydraulically, under the control of a servomotor not shown. As the molten glass mass is poured in, support 21 gradually descends at a speed commensurate with the rate of feed until it clears the extraction rollers 10. The assembly 21 – 24 may then be moved out of line with the kiln 1 so as not to hinder the further descent of the glass tube 12. The first-formed piece of tubing, shaped somewhat irregularly, may thereafter be cut off by the rotating disk 11.

In operation, the heaters 6, 7 and 7' may maintain a temperature of about 850° to 950°C in the foaming zone. Below that zone, the temperature may be held at about 550° to 650° by the ancillary heaters 8 and 8'. The top tier of coolers 9, 9' reduces this temperature to approximately 500°C whence it drops gradually to 50°C at the level of the extraction rollers 10.

It will be noted that the annular shoulders 18, 19 of the foaming zone maintain clearances between the body of tube 12 and the core 2 as well as the shell 1.

The system herein disclosed may operate with a low specific input of heat, e.g., of 400 to 800 kcal per kg of foam glass, and can be fully automated while being simple in structure and inexpensive to build and maintain. It is particularly useful for the production of pipes of large diameters, e.g., for the insulation of steam ducts and other fluid-carrying conduits.

I claim:

1. An apparatus for producing foamed-glass pipe, comprising:
   a kiln including an upstanding central core and a cylindrical shell coaxially surrounding said core with formation of an annular chamber therebetween, said chamber having a restricted neck at the top;
   a header coaxially overlying said kiln, said header having an outlet communicating with said neck;
   feed means on said header for continuously delivering a foamable glass mass through said outlet to said chamber;
   drive means for relatively rotating said header and said kiln about their axis during operation of said feed means;
   temperature-control means on said header and on said kiln for causing said mass to harden into a pipe on leaving said neck and descending in said chamber; and
   extraction means on said kiln below said shell for continuously pulling the hardened pipe out of the lower end of said chamber.

2. An apparatus as defined in claim 1 wherein said shell and said core are provided at their top with confronting annular shoulders defining a restricted portion of said chamber.

3. An apparatus as defined in claim 2 wherein said shoulders consist essentially of refractory material.

4. An apparatus as defined in claim 2 wherein said temperature-control means comprises heating means on said header and on said shell in the region of said restricted portion and cooling means on said shell at a level substantially below said restricted portion.

5. An apparatus as defined in claim 4 wherein said temperature-control means further comprises supplemental heating means and cooling means on said core respectively confronting the heating means and cooling means on said shell.

6. An apparatus as defined in claim 5 wherein said core terminates above the bottom of said shell, the cooling means on said shell extending beyond the lower end of said core.

7. An apparatus as defined in claim 1, further comprising supply means on said header for continuously delivering an elongated reinforcement to said chamber.

8. An apparatus as defined in claim 1, further comprising a temporary support for said mass introducible from below into said chamber for receiving an initial charge from said feed means.

9. An apparatus as defined in claim 8 wherein said temporary support comprises an annular platform.

10. An apparatus as defined in claim 9 wherein said chamber has a restricted neck portion at its top, said platform fitting closely into said neck portion.

* * * * *